July 13, 1943.  H. P. LUHN  2,324,221
COUNTING AND CONTROL MECHANISM
Filed Sept. 21, 1939    12 Sheets-Sheet 1

INVENTOR.
Hans P. Luhn
BY
Darby & Darby
ATTORNEYS

July 13, 1943. H. P. LUHN 2,324,221
COUNTING AND CONTROL MECHANISM
Filed Sept. 21, 1939 12 Sheets-Sheet 2

INVENTOR.
Hans P. Luhn
BY
Darby & Darby
ATTORNEYS

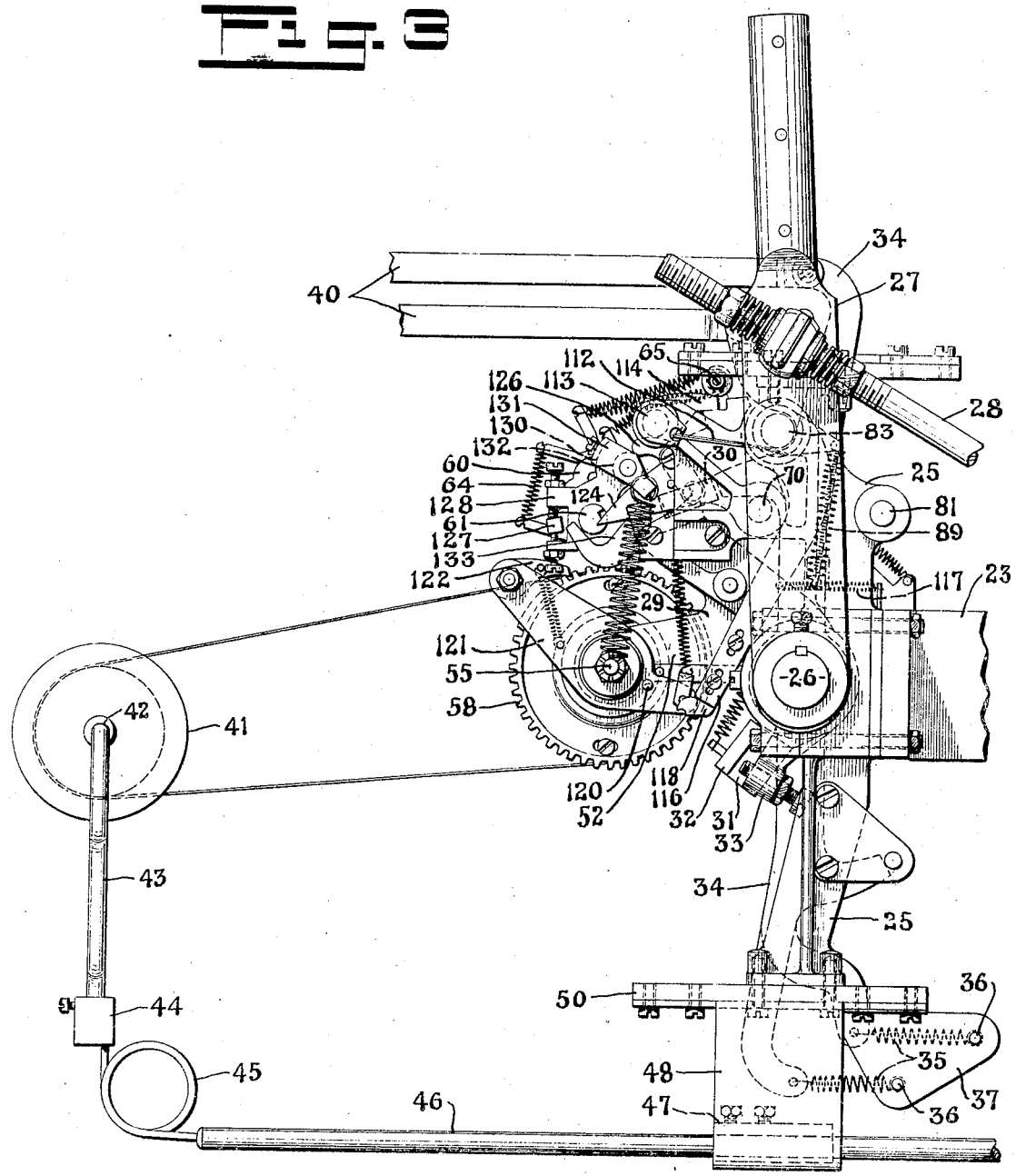

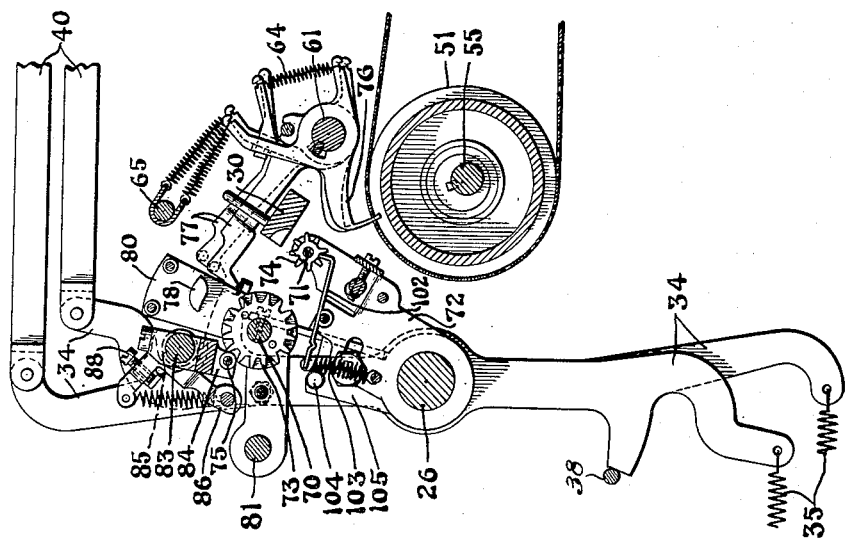
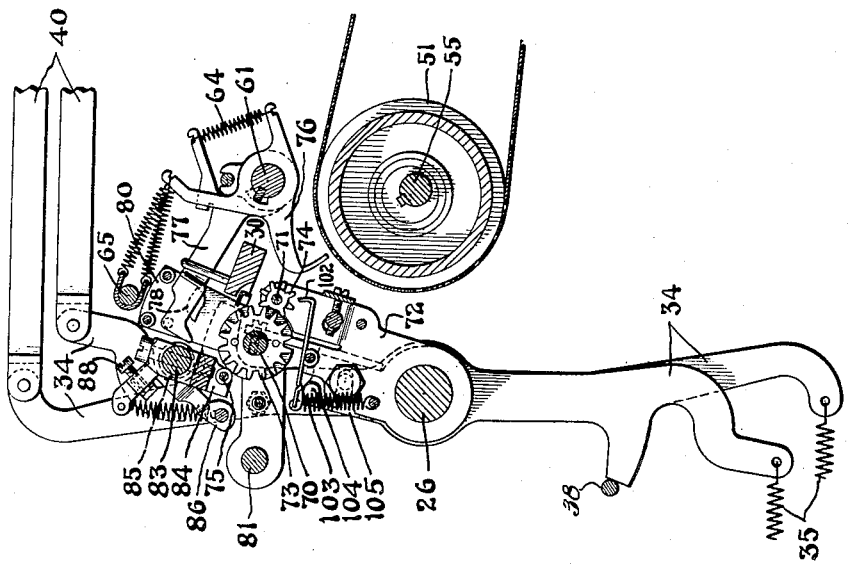

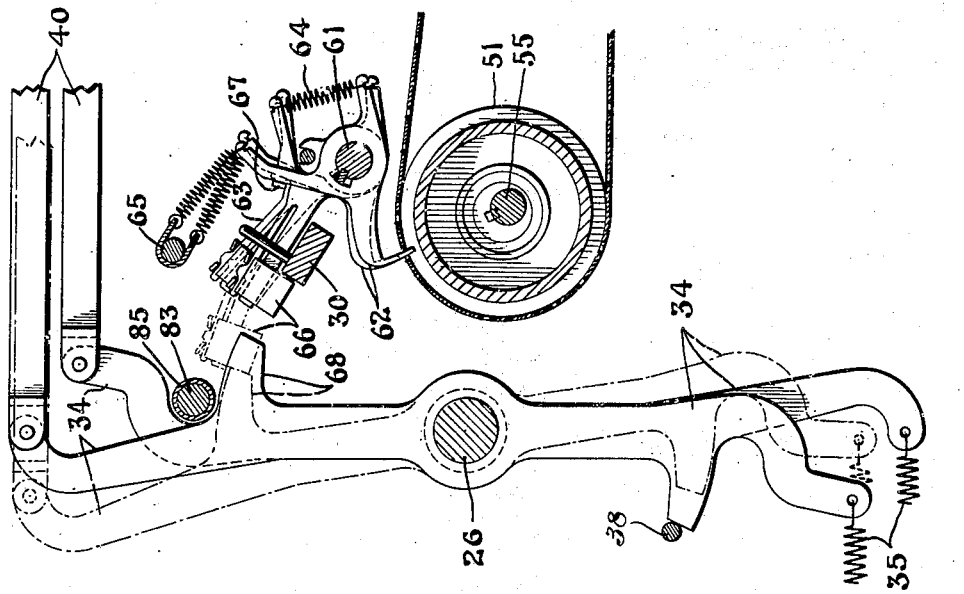
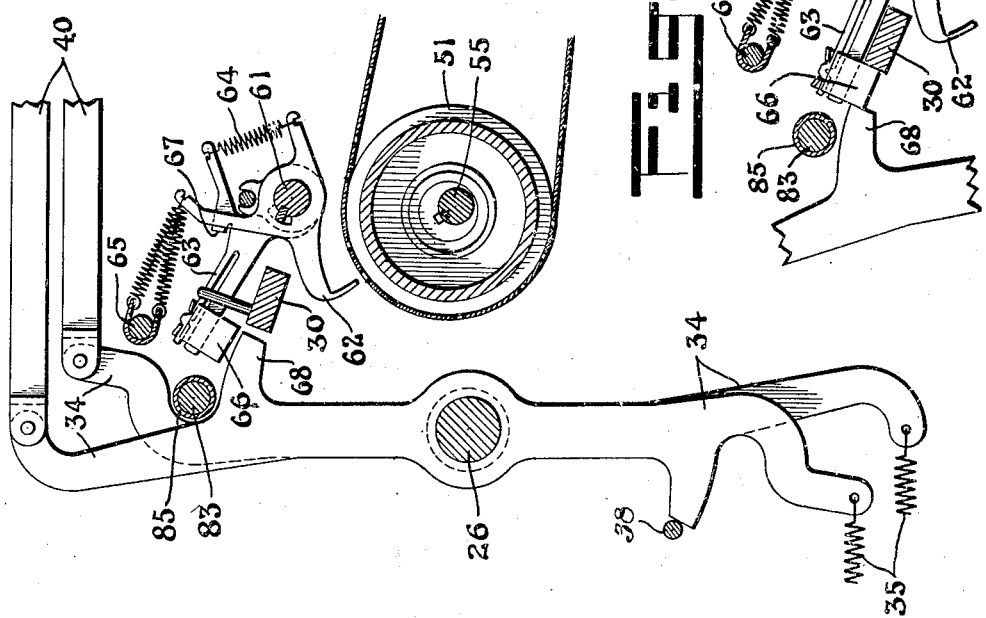

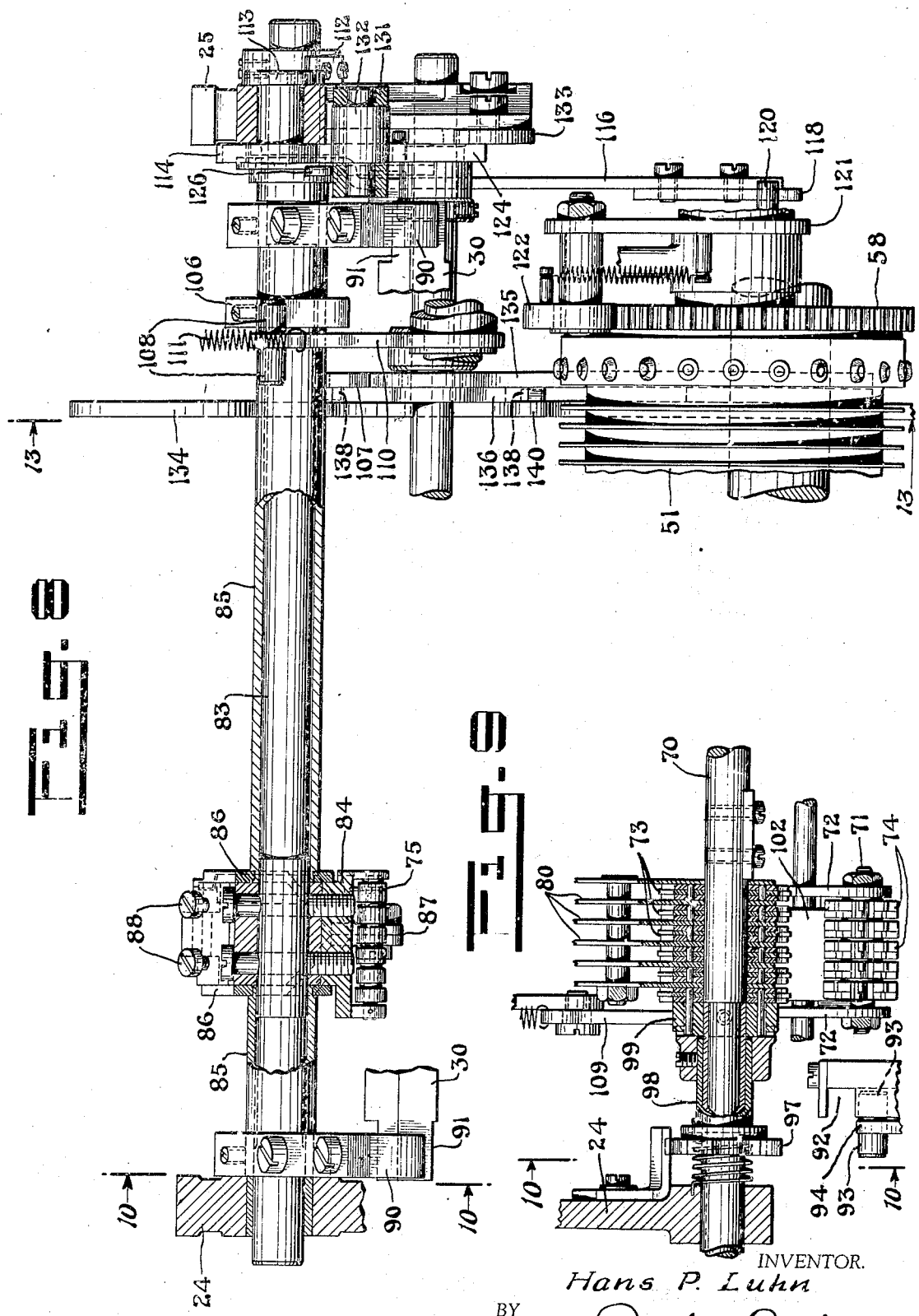

July 13, 1943.                H. P. LUHN                 2,324,221
                    COUNTING AND CONTROL MECHANISM
                Filed Sept. 21, 1939        12 Sheets-Sheet 7
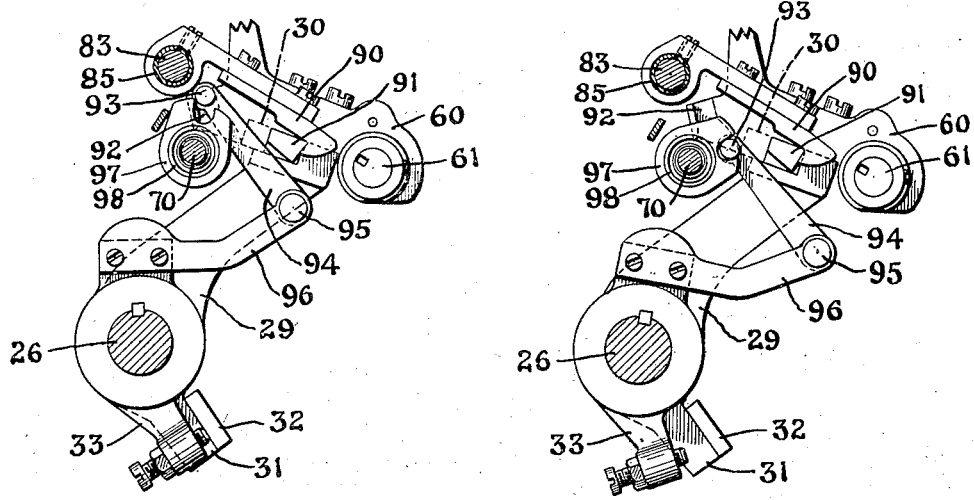
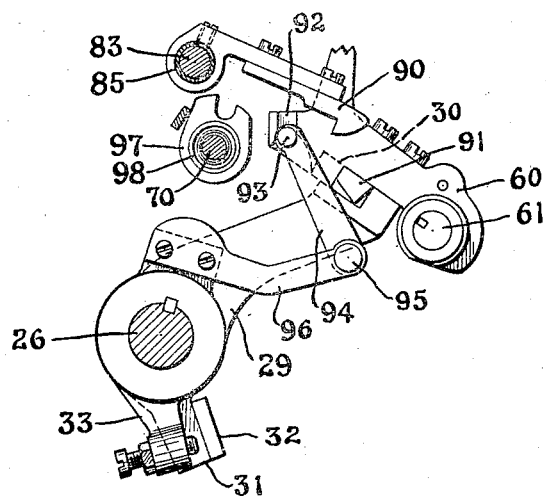
INVENTOR.
Hans P. Luhn
BY Darby & Darby
ATTORNEYS July 13, 1943.  H. P. LUHN  2,324,221
COUNTING AND CONTROL MECHANISM
Filed Sept. 21, 1939  12 Sheets-Sheet 9
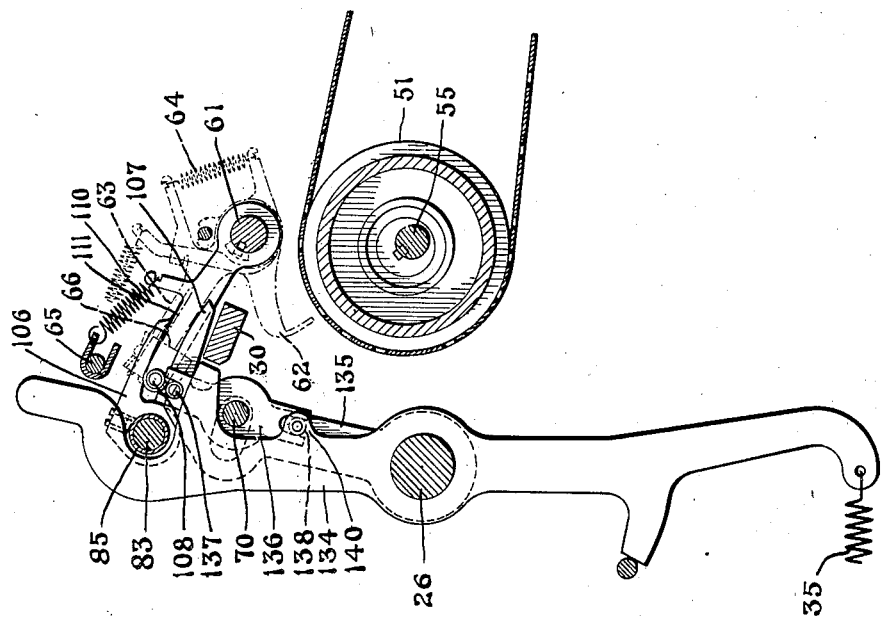
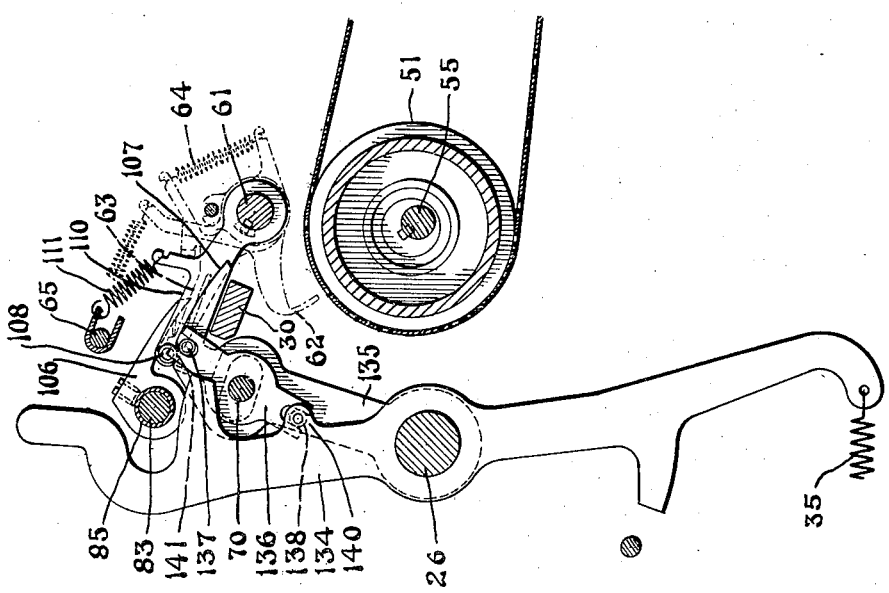
INVENTOR.
Hans P. Luhn
BY Darby & Darby
ATTORNEYS July 13, 1943.  H. P. LUHN  2,324,221
COUNTING AND CONTROL MECHANISM
Filed Sept. 21, 1939   12 Sheets-Sheet 10
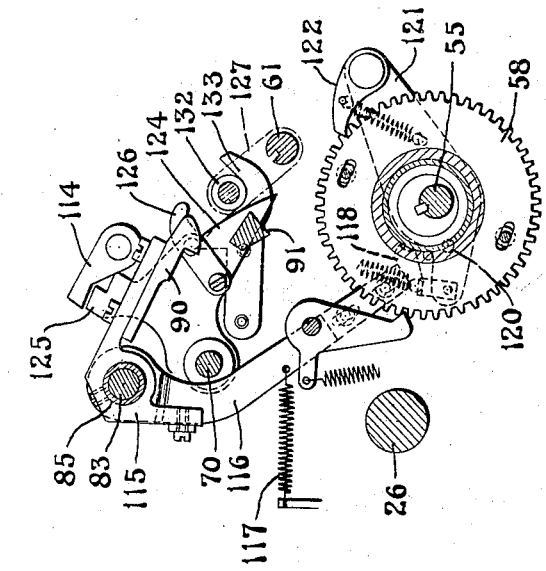
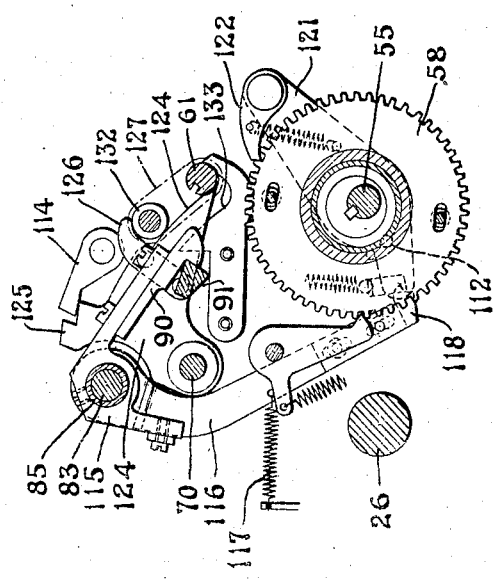
INVENTOR.
Hans P. Luhn
BY
Darby & Darby
ATTORNEYS

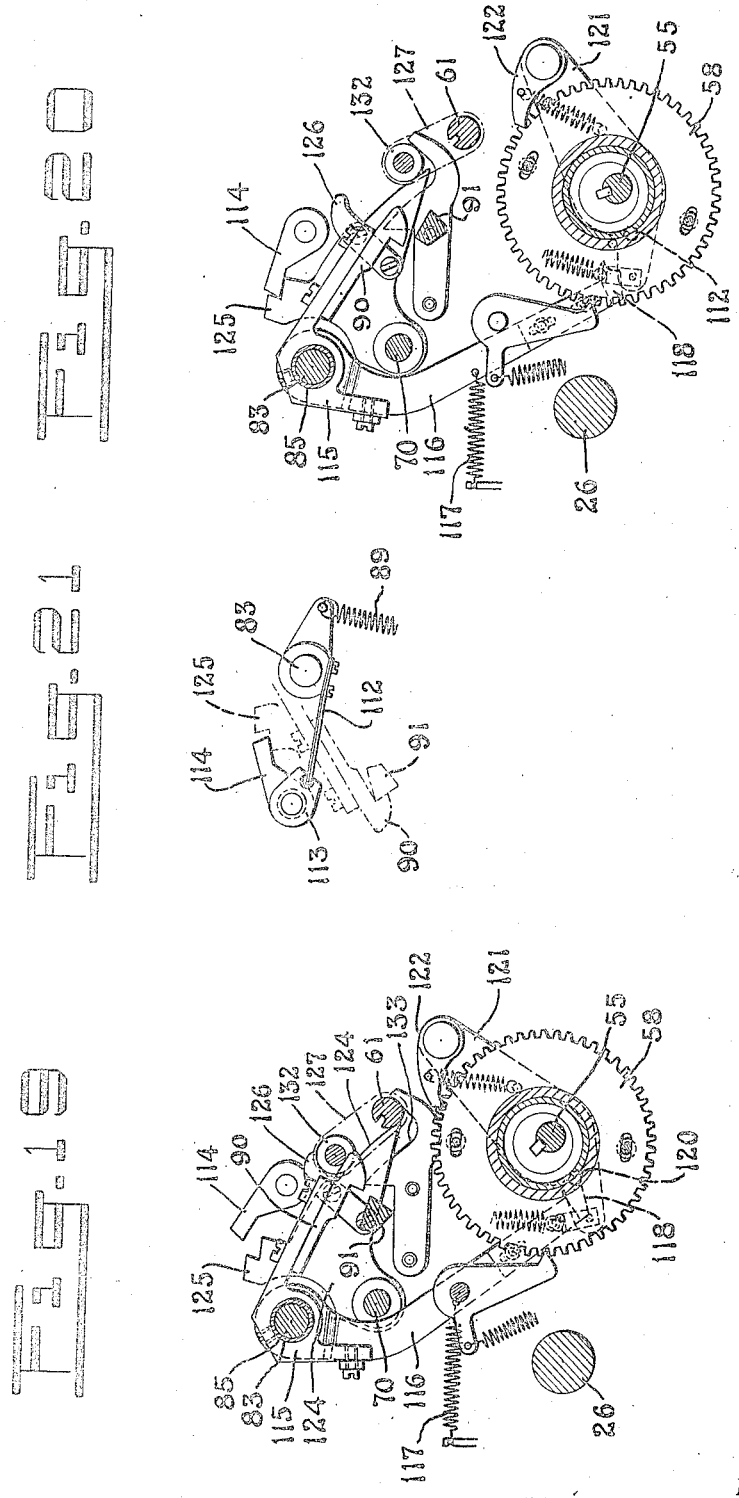

July 13, 1943.  H. P. LUHN  2,324,221
COUNTING AND CONTROL MECHANISM
Filed Sept. 21, 1939   12 Sheets-Sheet 12

INVENTOR.
Hans P. Luhn
BY
Darby & Darby
ATTORNEYS

Patented July 13, 1943

2,324,221

UNITED STATES PATENT OFFICE 2,324,221

COUNTING AND CONTROL MECHANISM

Hans P. Luhn, North Tarrytown, N. Y., assignor, by mesne assignments, to International Business Machines Corporation, a corporation of New York Application September 21, 1939, Serial No. 295,892

24 Claims. (Cl. 74—1)

The present invention relates to a mechanism for controlling machines of various types and especially to a mechanism which will operate various machine controls after the performance of a predetermined number of intervening operations.

The mechanism is particularly applicable to the control of a full-fashioning knitting machine for knitting stockings and will be described in that connection, although it is to be understood that the same or a similar mechanism has a large number of applications, as for example control of traffic signals, chemical processes, automatic machine tools, etc.

In my co-pending application Serial No. 276,659, for a Computing mechanism, I have disclosed a counter mechanism which is generally the same as the counter mechanism included in the disclosure following. However, in that application no mechanism was shown for selecting amongst a number of control elements and no mechanism was shown whereby the counter might cause actuation of these elements in predetermined sequence and after predetermined intervals.

At was stated above, the invention disclosed herein is particularly adapted to the control of a knitting machine. In such a machine a large number of operations have to be performed in a predetermined order and some operations have to persist for a considerable interval or during a considerable number of cycles of the knitting machine.

For example a number of courses of plain knitting may first be knit, after which the mode of operation of the knitting machine may be changed to knit a loose course, again to knit a picot stitch, and then again to knit a loose course, then in turn to knit additional courses of plain knitting.

At other times the mode of operation may be altered to perform a narrowing operation, immediately after which the knitting of plain courses is resumed.

In either one of the cases mentioned above the altered mode of operation to knit the loose courses, picot stitch, or to narrow the fabric persists during but a single cycle of the machine.

However, there are instances in which the control which modifies the knitting machine operation must remain actuated during a plurality of cycles of the machine. One example of such control is the automatic return of the narrowing fingers to their initial position prior to the performance of narrowing operations on the subsequent stocking.

In the past, the usual method of causing these operations of a knitting machine to be performed was to utilize a chain comprising links for each course to be knitted, each link having a button position thereon. This chain with buttons in selected ones of the positions was passed under a group of actuating levers in such manner that the levers were operated at the proper time to cause the correct action of the machine.

As will be seen, this required a chain of great length for whenever an action was to be performed followed by a certain number of courses of plain knitting a button had to be placed on a link of the chain in position to operate the lever for the action and following this button a number of blank button positions equal to the number of courses of plain knitting desired had to be provided.

If an action were to be performed and to persist during knitting of a number of courses, then it became necessary to provide a button in the column controlling that action in each button position representing a course.

In some instances this button-chain arrangement was replaced by a punched card, or a succession of punched cards. This arrangement, while having certain advantages in preparation, nevertheless still called for a control card of extreme length with consequent likelihood of error and difficulties in use.

In knitting machines there are a great number of varied controls which must be actuated at proper times. Amongst these may be mentioned the control for narrowing, the control for determining the tightness of the stitches, and the control for slowing the operation of the machine during certain operations, such as narrowing. For example, in knitting a stocking, it is sometimes necessary to cause a mechanism of the knitting machine to be operative during a single course and at other times necessary to cause that same mechanism to be operative for a number of successive courses. Furthermore, it is at times necessary to count the number of plain knit courses between other operations and at other times unnecessary to do so due to the fact that one control is actuated immediately after another, each lasting for one course only. The mechanism of my invention is capable of performing in such manner as to properly control a knitting machine to proceed in any one of the manners outlined above.

It is an object of my invention to produce a counter selector for a knitting machine which is readily attached to the knitting machine and is driven by that machine.

It is another object of my invention to produce such a counter in which the controlling element for the counter is a punched tape which is extremely short and therefore easily produced and handled.

It is another object of the invention to still further reduce the length of the control tape by making it possible for perforations in a single line of the tape to control both the actuation of the control portions of the controlled machine and the setting of the counter itself.

It is a further object of my invention to provide a sensing mechanism in the counter selector which exerts but light pressure on the controlling card or tape but which nevertheless causes positive actuation of the knitting machine control levers or elements.

It is a still further object of my invention to provide a counter selector in which the selector portion may be operable without the counter portion to cause the varied actions of the knitting machines to take place.

It is a still further object of my invention to provide a counter-selector in which an action may be caused to take place followed by a count of the courses of knitting prior to the occurrence of another action.

It is another object of my invention to provide a counter selector in which an action may be caused to take place and to be continued during a predetermined number of courses of knitting or cycles of the machine.

Other objects and features of my invention will appear when the following description is considered in connection with the appended drawings, in which Figure 1 is a top plan view of the counter selector of my invention;

Figure 3 is a right hand elevation of the mechanism;

Figure 4 is a fragmentary, cross-sectional view of the counter selector showing particularly the operation of the counter mechanism during a sensing operation;

Figure 5 is a view similar to Figure 4 but showing the various parts in the positions which they occupy when the carriage has been elevated and the counter has been set;

Figure 6 is a fragmentary, cross-sectional view taken on the plane of the lines 6—6 of Figure 1 showing the manner of actuating the knitting machine control levers. This view shows the parts in the positions which they occupy when the carriage is in its raised position;

Figure 7 is a view similar to Figure 6 but showing the position of the parts when the carriage is in its lower position and a sensing action is being performed;

Figure 7A is a fragmentary showing of some of the parts of Figure 7 showing the relationship therebetween when the carriage has been raised following an effective sensing operation;

Figure 8 is a front elevation of the mechanism with certain parts omitted and with certain parts broken away showing the manner in which the motion of the carriage is controlled by the operation of the counter;

Figure 9 is a detailed view partially in cross-section showing the construction of the counter portion of the mechanism;

Figure 10 is a vertical, cross-sectional view taken on the lines 10—10 of Figures 1, 8 and 9 showing the portions of the mechanism which hold the carriage in its elevated position as well as the portions of the mechanism which control the operation of the counter in a counting operation;

Figure 11 is a view similar to Figure 10 showing the positions of the counter actuating mechanism at a later stage than is shown in Figure 10;

Figure 12 is a view similar to Figure 10 showing the counter actuating mechanism in the position which it occupies when the carriage has been permitted to assume its lower position;

Figure 15 is likewise generally similar to Figure 13 but shows the positions of the parts during an interval in which an actuation of "hold" lever has been performed;

Figure 16 is likewise generally similar to Figure 13 but shows the position of the parts upon a raising of the carriage following a sensing operation in which the "hold" control hole was not present;

Figure 17 is a fragmentary, cross-sectional view of the mechanism taken on the line 17—17 of Figure 1 showing the mechanism for advancing the controlling tape and likewise a portion of the mechanism for assuring that the sensing fingers or members shall not descend upon the paper or card at certain periods in the operation of the machine;

Figure 18 is a view similar to Figure 17 but showing the position of the parts when the carriage is in its lowermost position;

Figure 19 is a view generally similar to Figures 17 and 18 showing the position of the parts of the tape or card feeding mechanism and the sensing finger control mechanism following a raising of the carriage not accompanied by the appropriate action to hold the carriage in its raised position;

Figure 20 is a view likewise similar to Figures 17 and 18 showing the positions of the parts when the carriage is in its lowermost position and has descended thereto without permitting the sensing fingers to descend upon the card or tape;

Figure 21 is a detailed view showing the mode of operating a portion of the mechanism shown in Figures 17 through 20.

Frame and main shaft

Figure 1:
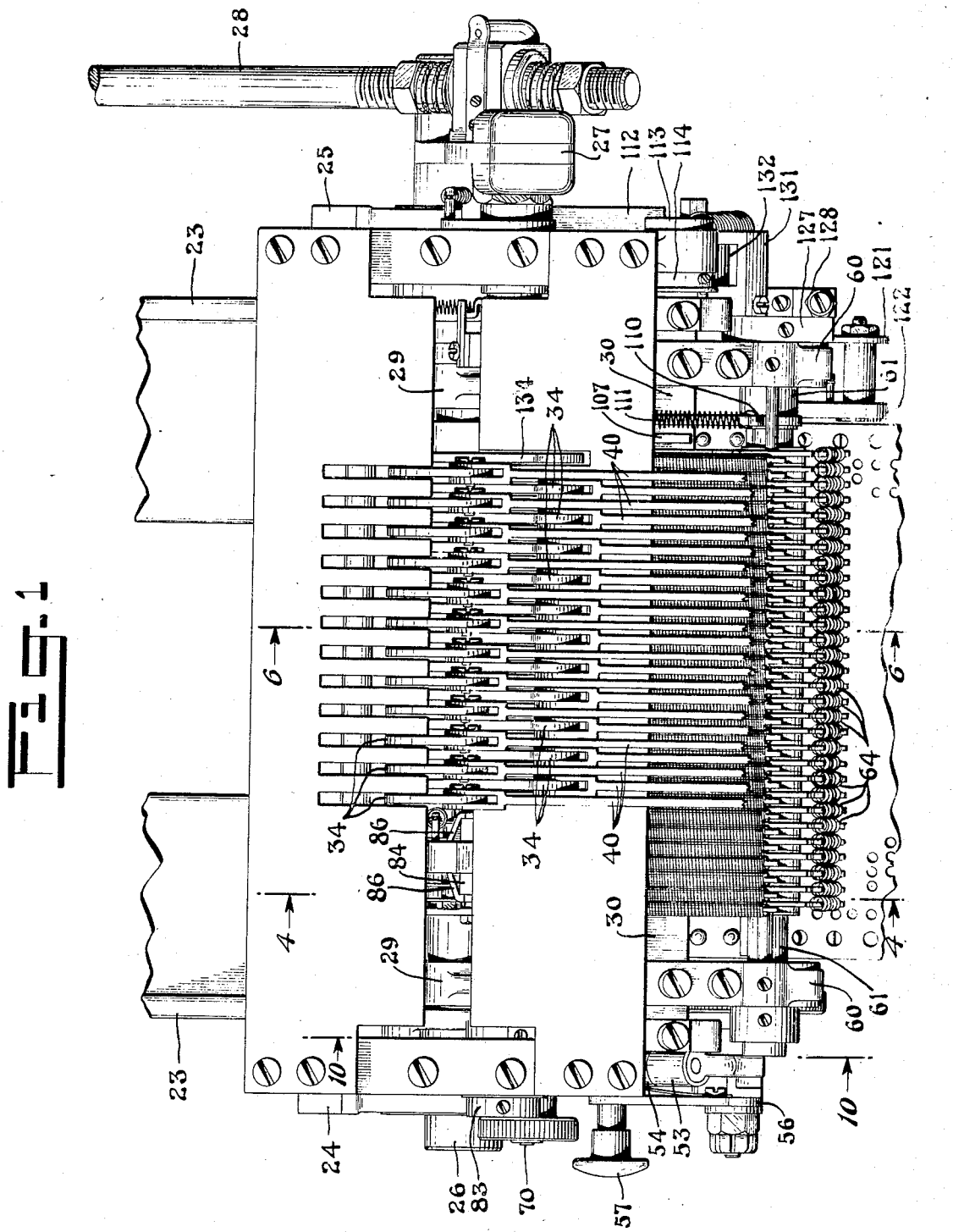

The entire counter selector mechanism is adapted to be mounted upon a machine to be controlled thereby although this is not necessary to its proper operation. This may be done either by mounting it directly upon the machine or by supporting the mechanism on angle bars, such as those shown at 23 in Figure 1. The various shafts and operating parts of the mechanism are supported from these rails or bars 23 through the medium of side frame members 24 and 25, as shown in Figures 2 and 3. Each of the two frame members 24 and 25 includes a bearing and cap which serve to rotatably mount the transversely extending main shaft 26. This main shaft may be oscillated by means of the handle 27, which may be manually operated but in normal use is connected by means of the rod 28 to the main drive of the controlled machine, as for example a knitting machine. Freely rotatable upon the shaft 26 is a sub-frame or carriage comprising two arms 29, see Figures 1 and 10, joined together by the bar 30 as well as by various ones of the shafts hereinafter described. These arms 29 have downward extensions 31 which are joined together by a transversely extending bar 32. Likewise mounted on the shaft 26 and keyed thereto are two downwardly extending arms 33, one on either side of the machine (Figures 2 and 3). At the lower ends of these arms are bosses into which screws are threaded to bear against the bar 32. It will be seen that when the shaft 26 is oscillated it will cause the carriage to be raised due to cooperation between the ends of the screws and the bar 32.

Tape drum

Figure 22:
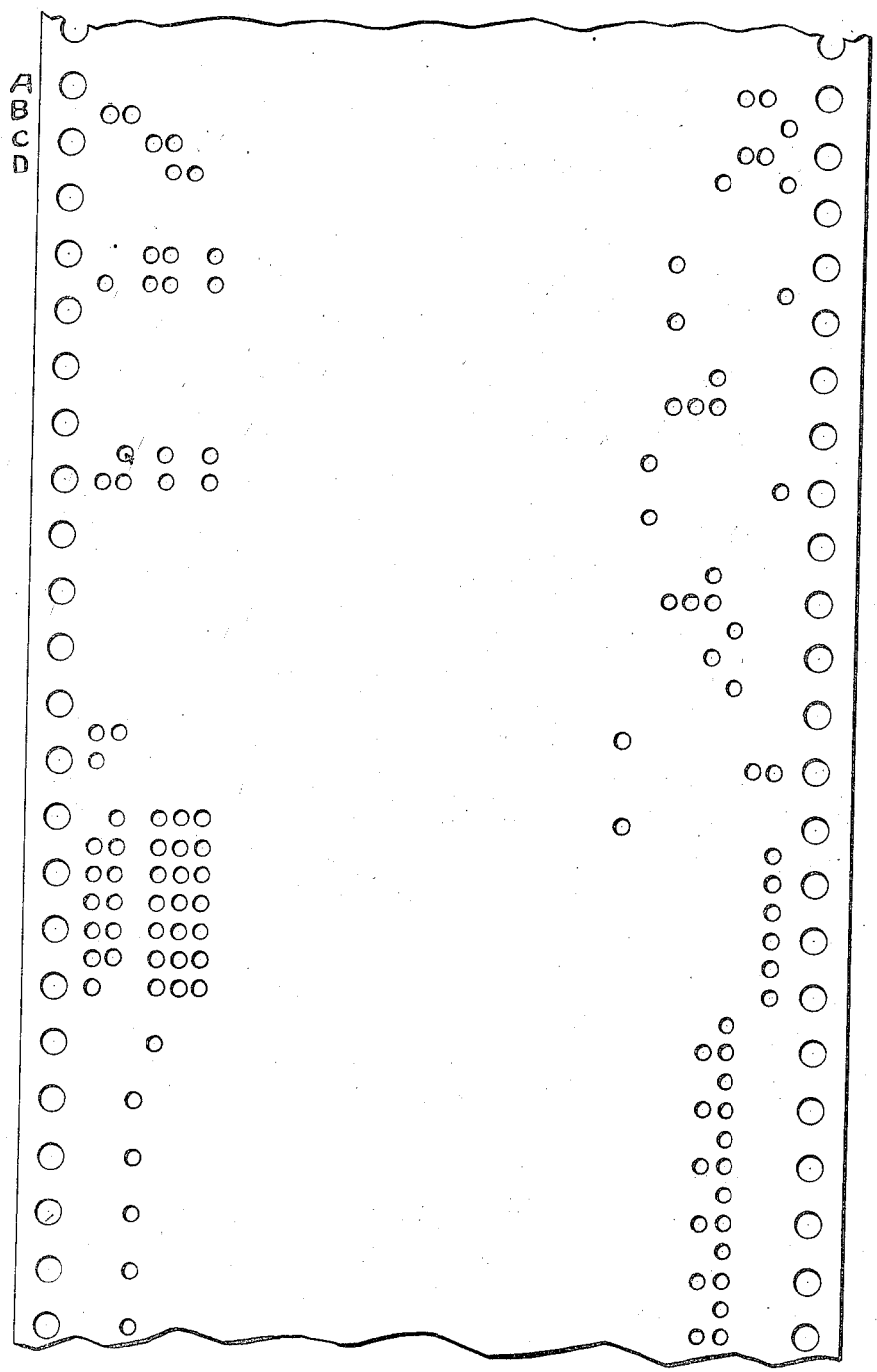
Figure 22 is an enlarged view of a portion of a typical control tape.

As was stated above, the mode of controlling the operation of the counter selector is a card or tape which may be considered as having two sections, one of which is punched in accordance with the binary system and the other of which has punchings for directly actuating certain levers. A typical example of such a tape is shown in Figure 22. This card or tape is fastened together at its ends to form an endless belt and is mounted on the machine in the position shown in Figures 1, 2 and 3. At its outermost end the tape is supported on a roller 41 (Figure 2) which rotates upon a shaft 42 supported on an arm 43 adjustably mounted in a block 44. Block 44 is in turn supported on a spring 45 which is rigidly joined to a rod 46 adjustably supported in a block 47, which block is mounted on a plate 48 having turned-up ends which are fixed to a plate 50 in turn supported on the lower ends of side members 24 and 25. At its other end the tape passes over a drum 51, which drum is mounted at its right hand end in an arm 52 which is integral with the right hand one of the sub-frame arms 29. At its left hand end the drum is supported in a bearing integral with a depending arm 53, which arm is bifurcated at its upper end and pivotally connected to a block 54 fastened to the left hand one of the arms 29. The drum 51 rotates on a shaft 55, eccentric extensions of which are the portions supported in the bearings mentioned. The left hand one of the eccentric extensions has integral therewith an arm 56 carrying at its end a handle 57. Also integral with this arm and with the left hand extension is an inwardly extending semi-circular projection which cooperates with an outwardly extending semi-circular projection on the arm 56 so that rotation of the entire shaft including the eccentric portions by means of the handle 57 will lower the drum slightly and disconnect the handle projection from the arm projection. Thus the arm 56 may be rotated about its pivot point, thereby making it possible to insert an endless tape onto the drum structure. At each end the drum carries a plurality of teeth which cooperate with feed holes in the tape so that as the drum is rotated the tape will be moved. At its right hand end the drum is provided with a ratchet wheel 58 which is driven by a pawl, hereinafter described, upon oscillation of the sub-frame or carriage.

Mechanism for operating control levers

Mounted on the shaft 26 are the control levers 34 (see also Figures 6 and 7), which control levers are biased to their inoperative position by means of the springs 35 stretched between the lower ends of the levers and rods 36 (Figure 2) supported in brackets 37 extending rearwardly from the frame members 24 and 25. Each of these levers 34 has an extension thereon which is adapted to cooperate with a rod 38 extending across the machine and acting as a stop. At the upper or lower end, as desirable, each lever 34 may be pivotally connected to a link 40 which is adapted to be connected to a control of the controlled machine.

In the particular embodiment of the invention herein described, there are 23 control levers 34, each of which is operated in accordance with the presence or absence of a hole in a particular column of the control tape. Since these levers are exactly similar, it is necessary to consider the operation of one only.

Extending across the device above the shaft 55 and supported in extensions 60 (Figures 2 and 3) of the arms 29 is a shaft 61. On this shaft are mounted the two-part sensing levers consisting of the sensing fingers 62 and the interposing members 63 (Figure 6), these two parts being yieldingly connected by means of springs 64 extending between arms on the parts 62 and 63. Parts 62 and 63 are rotatably mounted on the shaft 61 but their arc of rotation is limited due to the fact that a key extends through the shaft and into arcuate notches in both the sensing fingers and the interposing members. The notches in the sensing fingers are, however, of shorter arc than those in the interposing members. Each sensing finger 62 has an upwardly extending arm between which and a rod 65, likewise supported in extensions of the arms 29, a spring is stretched to cause the sensing finger to bear lightly against the control tape during a sensing operation. Each interposing arm 63 carries at its outermost end an interposing block 66.

Referring now to Figure 7, it will be seen that when a hole appears in the particular column with which the sensing finger 62 considered is associated that finger passes through the tape under urge of its spring and, through a lug 67 projecting from the side of the interposing member 63, causes that member to be rotated about the shaft 61, lowering the block 66 into position between bar 30 and a forwardly projecting extension 68 of lever 34. As the carriage rises, carrying the bar 30 with it, pressure is exerted upon the extension 68 of lever 34 and that lever therefore caused to rotate in a counter-clockwise direction, as seen in Figures 6 and 7, to pull on link 40 and initiate whatever action of the knitting machine may be controlled thereby. By reference to Figure 7A it will be noted that when the block 68 has been interposed between the two members as described the sensing finger may be oscillated clockwise by means of oscillation of the shaft 61 and cooperation of the key therein with the arcuate notch in the sensing finger, thus causing separation of the lug 67 and the upwardly extending arm of sensing finger 62 since block 66 is held as a wedge between bar 30 and extension 68. The mode and purpose of operation of shaft 61 will be described hereinafter.

Counting mechanism

The counting mechanism is of the binary type described in my copending application above mentioned and the counting discs thereof (Figures 4, 5, and 9) are mounted on a shaft 70 extending transversely of the machine and supported in the side frame members 24 and 25. The transfer pinions are rotatably mounted on a rod 71 supported in arms 72, which are in turn rotatably mounted on the shaft 26 and connected to the carriage for oscillation therewith. In the present embodiment of the invention the counting unit comprises six counting discs 73 and, of course, five transfer pinions 74, thus giving the counter a capacity of 63 units. As was set forth in the said copending application, this counter is a binary counter in which each disc has two effective positions, in one of which a notch in the disc lies beneath a feeler rod or feeler roller 75 and in the other of which an un-notched portion of the circumference of the wheel lies beneath this roller. In this particular counter the left hand one of the counter wheels lies in the units order of figures, the next succeeding wheel to the right in the twos order of figures, the next in the fours order, and so on to the last which lies in the 32s order. Also in this counter the transfer pinions 74 are adapted to effect a transfer to the higher order wheel upon each second step of rotation of the next lower order wheel.

Mounted on shaft 26 are the supporting arms or brackets 72 in which there is supported a rod 71 on which the transfer pinions 74 are mounted. When the sub-frame is oscillated to its upper position, these transfer pinions mesh with the counting wheels 73 so that upon each two steps of movement of the wheel of lower order a single step of movement of the wheel of the next highest order is caused. It should be noted that an aligning member 102 is provided to assure that the transfer pinions will not move during the period in which they are out of mesh with their respective counting wheels. This aligning member is pivoted on brackets 72 and is spring-urged upwardly by a spring 103 stretched between the left hand extension of the member and a pin on the bracket itself. The left hand extension of member 102 has a cam surface which cooperates with a pinion 104 on an arm 105, which arm is stationary and does not move with the carriage. Therefore, as the carriage is oscillated to its upper position this aligning member will be removed from the transfer pinions and will permit these pinions to perform their transfer function as the lowest order wheel is rotated.

Counter setting mechanism

It will be obvious that in setting the counter it is only necessary to move certain ones of the wheels through a single step of movement, leaving the remainder in their original positions. The counter wheels are set in accordance with punchings in the control tape and it is to be noted that these punchings are horizontally aligned and occupy a single line across the six columns of the tape which are reserved for the punching of counts to be performed. This is in distinction to those systems in which decimal counters are used and in which nine horizontal rows of hole positions must be reserved and passed over in order to properly actuate a counting mechanism.

The means for setting the counter comprises sensing fingers 76, see Figures 4 and 5, substantially identical to the sensing fingers 62 mentioned above. These fingers cooperate with setting pawls 77, to which they are yieldingly connected in the same manner as interposers 63 are connected to sensing fingers 62. It will be seen, therefore, that as the carriage is lowered, carrying the various sensing fingers with it, any finger 76 which passes through a hole in the control tape causes counter-clockwise rotation of the corresponding setting pawl 77 about shaft 61.

As the carriage subsequently rises, the oscillated pawls engage teeth of their associated counter wheels and cause rotation thereof through a single step of movement. In order to assure that the pawl noses maintain engagement with teeth of their associated wheels, rollers are provided on the pawls, which rollers ride against cam surfaces on the under sides of blocks 78, which blocks are fixed to spacing members supported on the shaft 70, as well as on a rod 81 extending transversely of the entire mechanism and supported in the side frames 24 and 25.

As is obvious, when the carriage reaches its highest position, the pawl rollers pass beyond the blocks 78 and therefore the pawls move upwardly under tension of their springs and return with the carriage to its lower position, the rollers thereof following paths lying above the blocks. It will be obvious that the maximum count which can be set up on the wheels is 63 since a single step of movement of the left hand wheel represents one, a single step of movement of the next wheel to the right two, of the succeeding wheel 4, and so on to the sixth wheel, the single step of movement of which represents 32. It is, of course, unnecessary to limit the number of the counter wheels or capacity of the counters.

Sensing finger lifting mechanism

Figure 2:
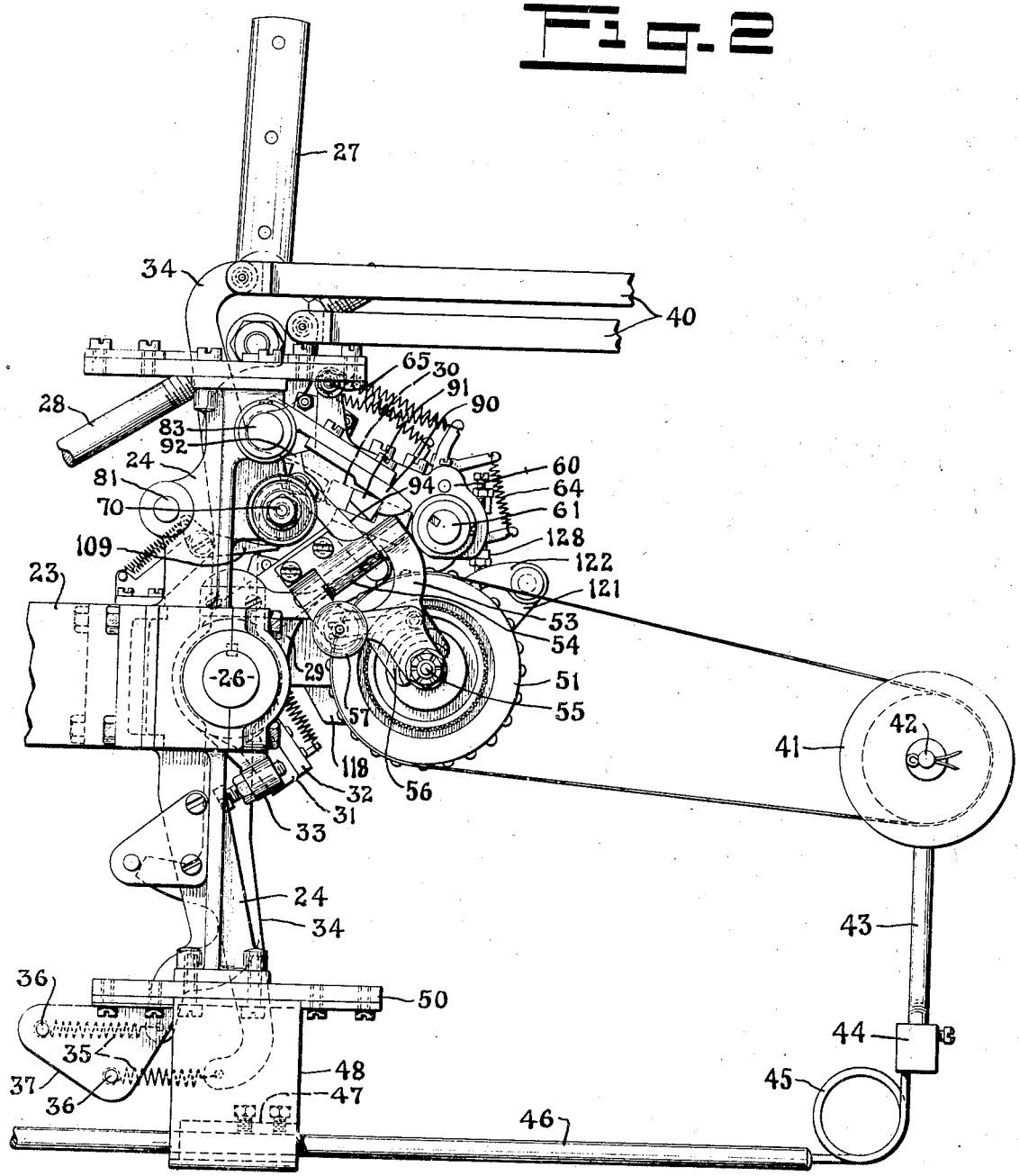
Figure 2 is a left hand elevation of the counter selector.

Referring now to Figures 1 and 3, there is keyed to shaft 61 near the right hand end thereof an arm 127. Adjustably connected to arm 127 and thus directly connected to shaft 61 is a block 128. The adjustable connection comprises a lug extending to the right of arm 127 and lying between two adjustment screws, one in each of two bifurcations of the block 128. Fixed to an upwardly extending arm 130 of block 128 is a U-shaped member 131 which carries a roller 132 which rests on the surface of a cam 133. Now, as the carriage is elevated, roller 132 moves upwardly out of contact with the surface of a cam 124 but in contact with cam 133 until the roller strikes the projection or hook 126, at which time it causes cam 124 to rotate about the shaft 70 and assume the position shown in Figure 17 which results in oscillating shaft 61.

Since, as was mentioned hereinabove, shaft 61 carries a key which cooperates with notches in the various sensing fingers, it will be obvious that when this shaft is rotated in a clockwise direction as described it raises all sensing fingers 62 and 76, permitting feeding of the tape.

Carriage locking mechanism

In order to actuate the counter step by step to count to a number previously set up by the counter setting mechanism, the carriage or sub-frame must be locked in its upper position. The mechanism for performing this locking operation is shown in Figures 4, 5 and 8 and comprises a feeler roller 75 which upon setting of the counter is forced outwardly by the cam action of the notches of the actuated counter discs. This feeler roller 75 is rotatably mounted in a block 84, which block is in turn fastened to a transversely extending shaft 83. At either end this shaft 83 has mounted on it a sleeve 85, Figure 8. The left hand one of the two sleeves 85 has fastened to it at its inner end an arm 86 which is bent inwardly, as shown in dotted lines in Figure 8, and joined at 87 to a similar arm fixed to the left end of the right hand sleeve 85. In addition to the downward extensions of the two arms 86, there are provided upward extensions, each of which has a lug thereon which lies beneath and cooperates with one of the two screws 88 which extend through an upward extension of block 84. The upward extension of block 84 is in addition connected by a spring to the arms 86 at their point of juncture 87 so that there is thus formed a yielding connection between the block 84 and the two sleeves 85. These two sleeves are by the construction described joined together to form in essence a single sleeve to which the block is yieldingly connected.

Whenever the counter wheels are out of alignment, as would be the condition after setting of the counter as described above, the block rotates shaft 83 in a clockwise direction as viewed from the left hand side of the device (Figure 2) and tends to cause rotation of the sleeves 85 in the same direction. In the absence of conditions which prevent such rotation, as will be hereinafter described, the sleeve will then rotate in a counter-clockwise direction and carry with it the arms 90 which are formed with hooks at their ends and are adapted to engage with extensions or lugs 91, Figure 2, of the cross-bar 30 of the sub-frame. When the sleeve is rotated as described the hooks will be lowered and due to cooperation with the extensions 91 will hold the entire carriage or sub-frame in its upper position irrespective of the operation of the handle and of the consequent movement of the bar 32. When the frame has been locked in position it will not be unlocked until the counter has been operated step by step a sufficient number of times to equal the count set up on the counter wheels by the operation hereinabove described. The accumulation of the count into the counter wheels is accomplished through the medium of mechanism shown in detail in Figures 9 through 12.

Counter actuating mechanism

Referring now to Figure 12, it will be seen that the arm 60 which is mounted on bar 30 carries at its left hand end an extension in which there is formed a cam slot 92. In this cam slot there lies a roller 93 which is mounted on an arm 94 pivoted at 95 to another arm 96 which is fixed to shaft 26 for movement therewith. It will be obvious from Figure 12 that as shaft 26 is oscillated and carries the sub-frame up and down with it the roller 93 will remain stationary with respect to the cam slot 92 without effecting any movement of any other part since the entire assembly, including the various links mentioned, simply pivot about the shaft 26. However, if the sub-frame is locked in its upper position in the manner described above, another roller 93 mounted on the other side of cam 94 will, as the shaft 26 is rotated clockwise (Figure 11), descend into a notch in a driving member 97 associated with the counter, and therefore as the handle is oscillated this driving member will be likewise oscillated through a small arc, one complete oscillation for each complete oscillation of the handle.

The driving member 97 is fixedly connected to a sleeve 98 on shaft 70, which sleeve carries upon it a toothed ratchet wheel which cooperates with a mating toothed wheel 99 (properly detented by detent 109, Figure 2), fixed to the lowest order or units one of the counting wheels or discs 73. The driving member 97 together with the sleeve 98 and the ratchet wheel is spring-pressed to the right by a coil spring compressed between member 97 and the side frame 24. This spring also urges the assembly counter-clockwise against a stop. Thus as the driving member is rotated in a clockwise direction, as viewed from the left, it together with the sleeve and ratchet wheel moves toward the left and, due to the tooth shapes, without driving the ratchet wheel 99. However, on the return stroke of the driving member 97 the spring presses the assemblage to the right and due to the shape of the teeth on the ratchet wheels the counter wheel or disc of the lowest order is driven forward one step.

After a sufficient number of oscillations of the driving member 97 the count set up will be reached and the feeler roller 75 will descend into the notches of the counter discs and permit counter-clockwise rotation of the shaft 83 under urge of spring 89 (Figure 3), thus causing counter-clockwise rotation of the sleeves 85 and the raising of the hooks of members 90 to unlock the sub-frame and permit it to move to its lower position. It is to be noted that this unlocking occurs at the time when the bar 32 has been oscillated to its uppermost position so that the locking frame moves to its lower position at the same speed as the bar 32, thus preventing any damage to the parts due to movement of the sub-frame while out of control.

Tape feeding mechanism

Mounted on the right hand one of the two sleeves 85 and fixed for rotation therewith is a bellcrank lever 115, the substantially horizontal arm of which is the right hand one of the two hooks 90 previously mentioned. The substantially vertical extension of this bellcrank lever is threaded at its extremity and has screwed to it a lug extending into the path of an arm 116, which arm is freely rotatable about the shaft 83 but is held against the lug by the spring 117 stretched between the arm and a fixed portion of the mechanism. Arm 116 carries at its lower end an adjustable pawl or foot 118 which when the sleeve 85 is rotated to its most counter-clockwise position, as seen in Figure 18, lies in the path of a pin 120. The pin 120 projects outwardly from a lever 121, which lever is rotatably mounted on the exterior of the bearing of shaft 55. On the opposite end of lever 121 there is pivoted a pawl 122 adapted to drive the ratchet wheel 58, which ratchet wheel is fixed to the feed drum 51. It will be seen from the above that when the carriage is oscillated about shaft 26 the foot or pawl 118 holds the pin 120 in a definite position so that rotation of the lever 121 with respect to the shaft 55 must occur and, therefore, the pawl 122 will drive the ratchet wheel 58 and with it the drum 51 (Figure 19).

Mechanism for permitting reduction in control tape length

It will be seen from the mechanisms described above that it is possible to cause operation of one or more of the control levers followed by the insertion of a count into the counter wheels and followed in the next cycle by locking of the carriage or sub-frame in its elevated position. However, this mode of operation requires the punching of a hole in one line of the tape to indicate which of the control levers is to be operated followed by a punching or series of punchings in a second line of the tape to determine the count to be set up. In order to reduce the length of the control tape, mechanism has been provided which makes it possible to punch the holes governing movements of the control levers and the hole or series of holes representing the counter setup in the same line of the tape. Using this mechanism, the first cycle of the machine causes actuation of the control lever and setting of the counter to the predetermined number. At the end of this cycle the carriage is returned to its lower position and since the tape feeding mechanism has been operated the sensing fingers would, in the absence of mechanism to prevent it, sense the next line of holes which would cause another actuation of the control lever and another setting of the counter wheels, which would be improper. It will also be obvious that if the carriage were locked in its elevated position during the completion of that cycle of operation in which the sensing fingers read the tape, the operated control lever would remain operated during the entire count, which is not proper under the circumstances mentioned above.

Mechanism for preventing double sensing

In order to prevent this double sensing, the sensing fingers are prevented from descending through the holes in the tape at the end of the first cycle. The mechanism for preventing this descent of the sensing fingers is shown in Figures 17 through 21. It cooperates with the sensing finger lifting mechanism already described.

Mounted on shaft 83 for movement therewith is a leaf spring 112 (see Figure 21), the outer end of which engages in a notch in an arm 113, which arm is fixed on a shaft rotatably mounted in the right hand bracket 25 and which shaft carries on its other end a pawl 114 which cooperates with the sensing finger lifting mechanism and specifically with the pawl-like portion 125 of cam 124 of this mechanism.

Now referring to the operation of first actuating a control lever and setting up a count and thereafter completing the count, as considered above, it will be seen that when the desired count is set up on the counter wheels, shaft 83 is rotated in a counter-clockwise direction, as seen in Figure 1, causing rotation of pawl 114 in a clockwise direction, as seen in Figure 21, and in a counter-clockwise direction, as seen in Figures 17 through 20.

As described above, when the carriage is first elevated pawl 114 falls into the notch of pawl 125, as shown in Figure 20, and prevents clockwise rotation of the cam 124 when the carriage is next lowered. Due to this retention of the cam in its rotated position, the roller 132 follows the surface of the cam which is now concentric with shaft 26. Due to this, the key in shaft 61 bears against the upper ends of the notches in the sensing fingers 76 and 82 and retains these sensing fingers in their elevated position. As a consequence, the lowering of the carriage is without effect at this time.

When the carriage is next raised, since the cam is still retained, the roller 132 follows the surface of cam 124 again and when the roller strikes hook 126 moves the cam slightly and frees the pawl 114 from pawl 125. At the termination of the preceding lowering of the carriage, sleeves 85 rotate in a clockwise direction, lowering the hooks 90. Therefore, at the end of this second elevation, the lugs 91 pass under the hooks which immediately move into position beyond the lugs and hold the carriage in its upper position, the parts then being in the position shown in Figure 17.

Immediately upon the completion of the count, shaft 83 is rotated due to the alignment of the notches in the counter discs and pawl 114 is raised to the position shown in Figure 19 and at the same time sleeve 85 is rotated and the hooks 90 are lifted, permitting lowering of the carriage and permitting restoration of cam 124 to the position shown in Figure 18 during that lowering. It is to be noted that a hook is provided on member 133, which member is fastened to the side frame 25. This hook prevents lowering of the roller beyond a definite point and by preventing such lowering determines the lowermost position of the entire carriage or sub-frame.

Locking delay mechanism

Figures 13 through 16 illustrate means which prevent the locking of the carriage in its upper position until after the operation of lever 34 and setting of the counter wheels and the elevation of the carriage the second time. The means mentioned comprise an arm 106 which is fixed to the right hand one of the two sleeves 85 as well as a cam 107 rotatably mounted on shaft 26 and normally held in the position in which it is shown in Figure 16. Cooperating with arm 106 and cam 107 is a pair of rollers 108, one of which lies on either side of an arm 110 which is freely rotatable about the shaft 61 and is urged by spring 111 in a counterclockwise direction, as seen in Figure 16.

When the counter wheels are set in the manner described above, shaft 83 rotates in a clockwise direction and sleeves 85 tend to follow. However, on the first elevation of the carriage and the setting of the counter wheels, this rotation of sleeves 85 is impossible since one of the pair of rollers 108 rests upon the surface of cam 107 and arm 106 rests upon the other of the pair of rollers. Due to this arrangement the two sleeves 85 are prevented from rotating, and consequently the two hooks 90, one fastened to each sleeve, are prevented from locking the carriage in its upper position and, therefore, as the cycle is completed the carriage moves to its lower position and just as it reaches this position the parts described above take the position shown in Figure 14, wherein the rollers 108 have passed beyond the nose of arm 106, thus permitting the arm 106 and the hooks 90 to assume their lower positions. Upon the next elevation of the carriage, the right hand one of the pair of rollers 108 rides upon the upper surface of arm 106, being held against this surface by the tension of spring 111, the parts then assuming the positions shown in Figure 13. Also upon this elevation of the carriage, hooks 90 pass over the lugs 91 and fall in behind them so that the carriage is locked in the elevated position. Mechanism described hereinabove then operates the counter step by step until the counter wheels or discs are again in alignment, at which time the carriage is released, since the tension of spring 111 is very light as compared with that of the spring which tends to rotate shaft 83 in a counter-clockwise direction, which action occurs as soon as each of the rollers 75 lies above a notch in its associated counter disc.

It is to be noted that the sensing fingers are prevented from sensing the punchings in the control tape during the lowering of the carriage considered above. It is also to be noted that feeding of the control tape is prevented during the second of the successive elevations.

Prevention of control tape feeding

If sleeve 85 has been rotated in a clockwise direction, as above described, the foot 118 of the tape feeding mechanism will move out of the path of pin 120, as shown in Figure 17, and the carriage may be elevated without causing feeding movement of the drum 51. Since, as described above, on the first elevation of the carriage after the sensing of holes in a line of the tape to control the setting of the counter and the operation of the control lever the clockwise movement of sleeve 85 is prevented by one of the rollers 108, it will be seen that during this first elevation foot 118 remains in the position of Figure 18 and the feed drum is advanced to its next position. However, as the carriage is lowered, the sleeve 85 rotates in a counter-clockwise direction, carrying arm 116 to the position in which it is shown in Figure 17 so that upon the next elevation of the carriage the foot 118 is out of the path of pin 120, and therefore, there is no advance of the drum upon the second elevation.

Mechanism for holding carriage in its elevated position immediately after sensing As was stated above, if the control lever is actuated and in the next cycle of operation of the machine a count is set up, the mechanism described under the preceding headings is unnecessary. However, since the punchings to initiate these two actions are to be in the same horizontal line of the controlling tape the mechanism there described is necessary in order to prevent the control lever from being held in its operated position during the counting operation.

However, there are times, as in automatically returning the narrowing fingers of a knitting machine, when it is desirable to have a control lever operated during a plurality of cycles of the machine and therefore desirable to render the mechanism described under the preceding heading ineffective.

The mechanism for holding the carriage in its elevated position immediately following the sensing operation, or in other words, for rendering the mechanism described under the preceding heading ineffective, is shown in Figures 13 through 16. The mechanism is extremely simple and comprises a "hold" lever 134 which is generally similar to the control levers 34 with the exception that this "hold" lever is not connected by any link to operating parts of the knitting or other controlled machine. Mounted adjacent to the "hold" lever 134 is an arm 135 on which there is pivoted a lever 136 having a notch cut in either end. Into the upper one of these two notches extends a roller 137 which is pivoted to the arm 107. Into the lower of the two notches extends a roller 138 which is mounted on a projection 140 of the lever 134. The "hold" lever 134 is adapted to be rotated in a counter-clockwise direction, as seen in Figures 13 to 16, by means of an interposer exactly similar to the interposers 66 described in connection with Figures 6–7A and designated by the same reference numeral because of this similarity. This interposer lies toward the observer and for this reason is shown in dotted lines in Figures 13 through 16. A special "hold" position is provided in the control tape for cooperation with the sensing finger 62 which controls the operation of this interposer.

Thus whenever a hole lies under this sensing finger 62 the interposer 66 associated with the "hold" lever 134 is placed between the bar 30 and a forward extension of the lever. As the carriage or sub-frame is elevated the "hold" 134 will be rotated counter-clockwise through a small angle to the position shown in Figure 15. This rotation of the control lever will cause rotation of the lever 136 about its central pivot point and will thereby cause the cam 107 to be rotated in a clockwise direction until it likewise takes the position shown in Figure 15. When the cam lies in this position, roller 108 may descend into a notch 141 in the surface of the cam whereby it is now possible for the arm 106 to rotate in a clockwise direction to permit the hooks 90 to fall behind the lugs 91 and to hold the carriage in its elevated position.

Any control lever which has been operated will continue to be operated during the completion of the count set up on the counter wheels, since any of the interposer blocks 66 which may have been positioned between the bar 30 and forward extensions of the control levers 34 will remain in that position as long as the carriage remains in its upper position.

It will be seen that due to the rotation of shaft 83 the pawl 114 will be rotated as before. Further, this pawl will fall into the notch in the co-operating pawl member 125, as shown in Figure 17. This operation, however, will have no effect since the carriage remains in this elevated position until the count is completed, at which time shaft 83, together with sleeve 85, is restored to its original position, rotating pawl 114 so that the nose is removed from the notch of pawl member 125 and at the same time elevating the hooks 90 so that the carriage is permitted to assume its lower position and the parts are restored to the position shown in Figure 18.

Operation

As will be seen by reference to Figure 1, the particular embodiment of the counter selector of this invention illustrated is capable of controlling 23 different actions of the machine controlled thereby, which actions may in turn involve the actuation of other counter mechanisms. The selection of these different actions is determined by the location of punchings in a controlling card or tape, and the number of courses to be knitted following the actuation of any control lever or the number of courses to be knitted while any control lever is actuated is determined by punchings in the same control tape located, however, in positions to govern the setting of a counter.

The counter selector is adapted, as is indicated by the description of the construction given hereinabove, to perform any one of four distinct types of operation, namely:

(a) Operation of a control lever only
(b) Counting only
(c) Operation of a control lever followed by counting
(d) Operation of a control lever and retention of the lever in operated position during counting.

Examples of these four types of operation follow:

Figure 22 shows a sample control tape or card which may be considered to be the control card shown in the machine in Figures 2 and 3. At the left and right of this control card are relatively large holes which are feed holes adapted to engage with pins fixed in the periphery of the feed drum at the extremities thereof. On the line of this controlled card designated A there are punchings in the second and third columns from the right, which punchings may be taken as those governing the action of control levers which operate the narrowing and slow control of the knitting or other controlled machine. On the line B of this card are shown punchings in the first and second columns to the left as well as a punching in the right hand or "hold" column. Since the first six columns to the left of the card are reserved for counter setting and since the counter is, as explained above, of the binary type, these two holes would represent a count of 3 to be set up in the counter wheels representing a total of four courses to be knit without actuation of any control lever, while the "hold" hole indicates that the carriage is to be held in elevated position after its first upward movement.

On the line C of the card there are shown punchings necessary to cause actions to be performed followed by counting. These punchings comprise holes in the second and third columns from the right of the card, indicating that the narrowing and slow operations of the knitting machine are to be performed, together with punchings in the third and fourth columns from the left of the card, indicating that following the narrowing and slow operations thirteen courses of plain knitting are to be performed. In row D of the card there are shown punchings in the right hand column and in the fourth column from the right as well as punchings in the fourth and fifth columns from the left of the card. The punching in the fourth column from the right indicates that the associated control lever is to be operated. The punching in the first hole at the right indicates that this control lever is to be held operated during the count, and the punchings in the fourth and fifth columns from the left of the card indicate that this count is to be one of twenty-four units.

(a) Operation of a control lever only

If the card of Figure 22 be placed upon the feed drum 51 in such manner that line A of perforations lies beneath the sensing fingers 62 and 76, then upon the first following descent of the carriage, fingers 62 in the second and third positions from the right will pass through the holes and cause interposition of blocks 66 between bar 30 and forward projections 68 of the corresponding levers 34. Upon the elevation of the carriage or sub-frame, these two levers will be rotated in a counter-clockwise direction, as seen in Figures 6 and 7, causing the links 40 connected thereto to be pulled to the right (Figure 3) actuating the proper portions of the knitting machine mechanism to cause the narrowing action to be performed and to be performed at a slow speed. Since no count was set up there will be no actuation of the counting wheels or discs and consequently no movement of either shaft 83 or sleeves 85 or of the various parts connected thereto, and as a consequence when the actuating lever or handle permits lowering of the arms 29, the carriage will follow and restore to its lower position. However, during the elevation of the carriage, the foot or pawl 118 will have been positioned in the path of the pin 120 and, therefore, the feed drum will have been rotated through a step of movement positioning the line B of perforations in the path of the sensing fingers.

(b) Counting only

Since no relowering of the carriage is necessary in performing pure counting is punched as described above.

The fingers 76 in descending will find perforations in the first and second columns from the left of the card and the "hold" sensing finger 62 will find a perforation in the right hand column. These perforations will serve to permit lowering of the two left hand setting pawls 77 which will act in the manner described hereinbefore to move each of the two counter wheels or discs to the left of the series a single step in a counter-clockwise direction. This movement of the wheels will move the notches thereof out of alignment with the remaining wheels of the series, thus forcing the feeler rollers 75 to the rear, thus causing block 84 to which these rollers are fastened to rotate in a clockwise direction, as seen in Figures 4 and 5, the block carrying with it shaft 83. The right hand perforation will cause operation of "hold" lever 134 so that during the elevation of the carriage which caused this setting of the counter wheels, one of the rollers 108 rides up the surface of cam 107 which is rotated to its Figure 15 position while the other roller lies beneath the arm 106, thus making it possible for the sleeves 85 to rotate with the shaft 83 upon its operation as set forth immediately above.

The hooks 90 will fall in behind the extensions 91 and hold the carriage in its elevated position. Further during the elevation feeding action of the ratchet wheel 58 and the associated drum 51 will occur. It will be seen that since this feeding action occurs, the ensuing line of perforations, that is, line C, lies in position to be sensed.

Upon the next operation of the handle, whether manually or operated by the controlled machine, the carriage will remain in its elevated position. However, roller 93 will move in the slot 92 as the arms 29 are oscillated clockwise and in so doing the extension of this roller 93 will fall into the notch in counter drive member 97 and will cause it to oscillate counter-clockwise, assuming the position in which the parts are shown in Figure 11. Upon the next movement of the handle and arms 29 in a counter-clockwise direction, the roller 93 will ascend in the slot 92 and carry drive member 97 in a counter-clockwise direction, this oscillation of the drive member 97 acting through the ratchet mechanism previously described to advance the counter disc of lowest order through one step of movement. Upon the next complete cyclic operation of the handle the counter wheels of lowest order will be advanved through another step of movement and at the same time the counter wheel of next highest order will also be advanced through one step of movement.

Upon the next ensuing complete cyclic operation of the handle, the drive member 97 will again advance the wheel of lowest order through one step of movement. Due to this operation the notches in the two counter wheels of lowest order will again align and will align also with the notches in the counter wheels of higher orders so that the feeler rollers 75 will fall into the notches, thus permitting counter-clockwise rotation of the shaft 83 and sleeves 85, causing the hooks 90 to be raised and the various mechanisms described above to be restored to their original positions.

Figure 13:
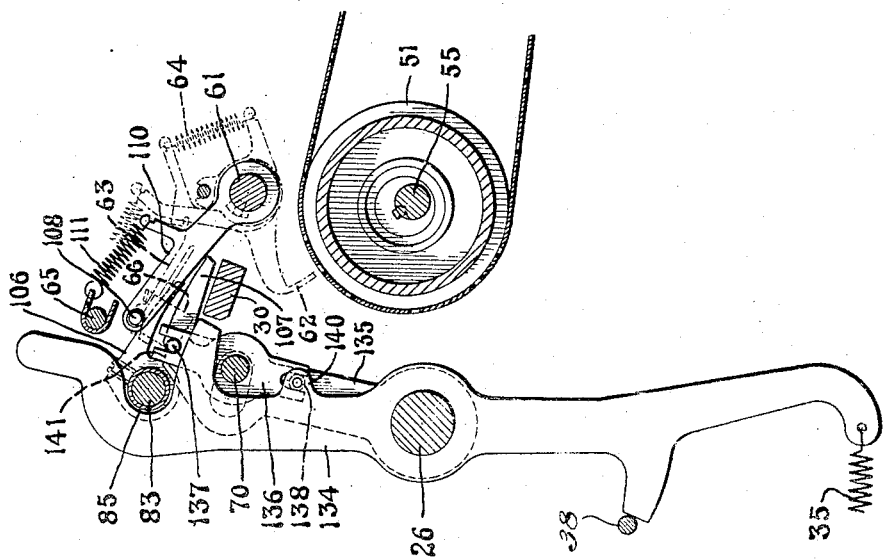
Figure 13 is a fragmentary, cross-sectional view taken on the plane of the line 13—13 of Figure 1 showing particularly the mechanism for controlling the holding of the carriage in its upper position as is necessary at times to assure that a certain control lever which has been preselected may be operated during a number of courses or an interval of time determined by the counter mechanism.

Thus upon the descent of the carriage, the feeler fingers are permitted to lie on the surface of the control card or pass therethrough, as the case may be, and the parts returned to the positions shown in Figures 12 and 13, the various sensing fingers 76 and 62 lying in positions determined by the punchings in line C of the card. It will be noted that during the operation above described the counter wheels were set on the first operation of the controlled machine, and thereafter a count completed corresponding to this setting. In the above instance, the count set was 3 and three cycles of operation of the controlled machine followed in order to complete this count. The setting and the counting operation together occupied four cycles of the controlled machine and as has been explained above, this discrepancy between the counter setting and the number of cycles performed by the machine is accounted for by perforating the controlled tape to represent a number one less than the desired count. It follows from this that the least number of operations of the controlled machine that can be controlled by a counter set-up is two. However, if a count of a single operation of the controlled machine is desired it is only necessary to supply an unperforated line in the control tape.

(c) Operation of a control lever followed by counting

As stated above, the carriage descends to its lower position with the various sensing fingers lying on the surface of the card or extending therethrough in accordance with the punchings in the line C of Figure 22. There are thus at this time two interposers which are positioned to operate their associated control levers and also two setting pawls positioned to operate their associated counter wheels or discs. The particular control lever interposers which are positioned are those in the second and third columns from the right of the card and the two setting pawls positioned to operate their associated wheels are those in the third and fourth columns from the left of the card. Thus the count which is to be set up is 12 and since one cycle is required for the setting, it follows that the controlled machine will operate through 13 cycles subsequent to the operation of the control levers.

During the elevation of the carriage one of the rollers 108 lies on the surface of cam 107 while the other roller 108 lies beneath arm 106 thus making it impossible for sleeves 85 to rotate with shaft 83. Also upon the descent of the carriage the interposer blocks will be raised from between the levers and bar 30 so that no further actuation of the control levers will occur.

On this elevation of the carriage, the two interposer blocks 68 of the second and third columns will cause the control levers 34 of these two columns to be operated. At the time these are operated, the setting pawls 71 of the third and fourth columns will move the third and fourth counter wheels to their new positions and in the manner described above the shaft 83 will be oscillated. Operation of shaft 83 causes pawl 114 to take the position shown in Figures 20 and 21, thus holding the cam 124 in its elevated position to which it has been carried by co-action of the roller 132 and hook 126 as above described.

Upon the descent of the carriage, cam 124 will remain in its upper position and as a consequence roller 132 will follow the cam surface until the carriage is in its lower position, at which time the parts will occupy the position shown in Figure 20. Due to the fact that the roller 132 follows the surface of cam 124 during descent, the shaft 61 remains rotated as described under Sensing finger lifting mechanism, and all sensing fingers remain elevated so that they neither fall upon the surface of the control card or pass through the perforations in it.

Figure 14:
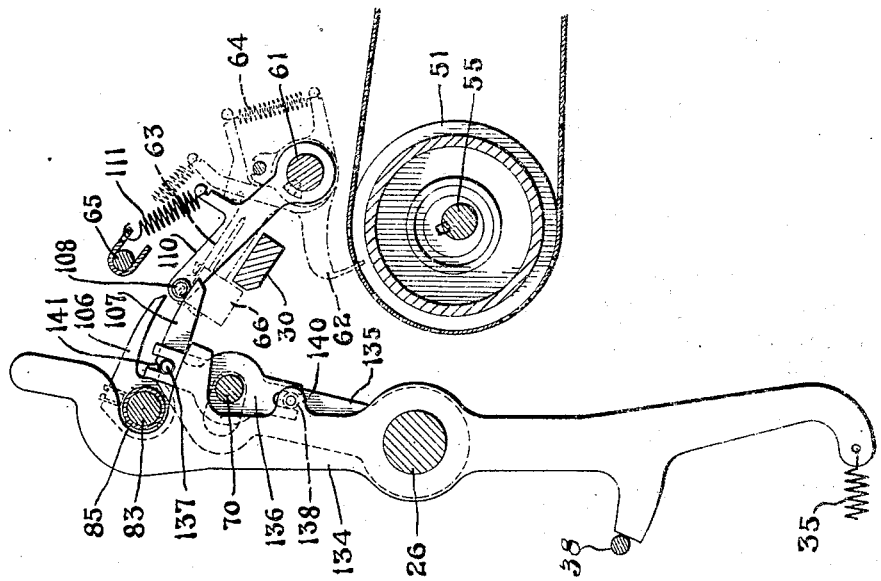
Figure 14 is generally similar to Figure 13 but shows the position of the parts after the release of the carriage, its movement to its lower position, and the sensing of a "hold" control hole.

Just prior to the completion of the descent of the carriage, roller 108 will come to the position in which it is shown in Figure 14, and this will free the arm 106 so that it may rotate clockwise under drive of the spring in the yielding connection between it and shaft 83, thereby lowering the hooks 90 and permitting arm 116 to rotate in a counter-clockwise direction, taking the foot or pawl 118 out of the path of pin 120 (Figure 20).

On the next elevation of the carriage, the roller 108 will ride along the upper surface of arm 106 and the hooks 90 will fall in behind lugs 91 as the carriage reaches its upper position and will lock the carriage in that position. In succeeding cycles, therefore, the counter actuating mechanism will be operated as described hereinabove and at the termination of the twelfth cycle the notches in the counter discs will again come into alignment, and due to operation of the mechanism, including shaft 83, sleeves 85 and hooks 90, the carriage will be released and returned to its lower position. Thus in this cycle of operation we have operated the two control levers during one cycle of the controlled machine and have thereafter counted 13 cycles during which the normal operation of the controlled machine continues.

(d) Operation of a control lever and retention of the lever in its operated position during counting When the carriage descends following the completion of the count of 13, the sensing fingers in the right hand column and in the column fourth from the right, pass through perforations and consequently the corresponding interposer blocks are positioned to operate their levers. The right hand one of these levers is, however, not a control lever but the holding lever 134 shown in Figures 13 through 16 and previously described in connection therewith. When the line D is sensed, sensing fingers in the fourth and fifth columns from the left of the card also find perforations and since these sensing fingers control setting pawls the fourth and fifth of the counter discs are moved from their zero position to a new position which sets up a count in accordance with the binary system which equals 24. As before, this count will be increased by one due to the fact that the first cycle serves to set the counter. During the first elevation of the carriage, substantially at the uppermost position thereof, the shaft 83 is rotated in the manner described hereinbefore. However, at the same time or at approximately the same time, the control lever 134 is rotated and acting through the mechanism described above causes clockwise rotation of cam 107, thus positioning the notch 141 at the rear of the face of this cam forward of its usual position so that the roller 108 may be lowered and permitting sleeves 85 to rotate with shaft 83, lowering the hooks 90, and locking the carriage in its upper position immediately. Also at this time pawl 114 will rotate to the position shown in Figure 17 and the other parts will have taken the position shown in Figure 17.

Although at this time the pawl 114 is in position to hold the cam 107 in its counter-clockwise position, this action is ineffective since the roller 132 coacting with projection 126 serves to actually hold the pawl face of pawl 125 away from the face of pawl 114. At this time the tape has been advanced one position.

It will be observed that the control lever actuated is continued in its actuated position since blocks 68 remain between the bar 30 and the forward projections of these control levers and the carriage is locked in its upper position. On the operation of the handle the counter actuating mechanism will be operated, advancing one step for each successive lowering and raising of the handle, this action continuing for twenty-four steps of movement or twenty-four complete oscillations of the handle. After such movements the feeler rollers will again find aligned notches in the counter wheels and thus permit shaft 83, together with the sleeves 85, to return to their normal position, thereupon raising pawl 114 and permitting the hooks 90 to rise, thus allowing the carriage to return to its lowermost position. When the carriage descends the blocks 66 are, of course, elevated due to the spring tension on the arms 63 and, therefore, the control levers which remained operated during the entire twenty-five cycles as well as the interposer blocks are restored to their normal position. During the period of operation just described, therefore, the two control levers have been held in their actuated position during twenty-five cycles and during those twenty-five cycles the controlled machine will perform some special operation, as for example, in connection with the knitting machine, a narrowing finger restoring operation.

While I have described a preferred embodiment of my invention, it is to be understood that it is possible to embody the invention in many other forms and, therefore, it is to be understood that the description is for the purpose of illustration only and that no limitation is to be implied by this description but the invention is to be limited solely by the appended claims.

What is claimed is:

1. In a counter selector mechanism adapted to actuate the control elements of a controlled machine in predetermined sequence and for predetermined intervals, in combination, a record having a plurality of lines of record element positions, all elements being identical, means for simultaneously and effectively sensing the presence or absence of elements in all positions of a single line, a movable carriage on which said record and said sensing means are mounted, a driving element mounted on said carriage, pivotally mounted control levers, and interposing means responsive to said sensing means to cause said drive element to actuate said control levers.

2. In a record controlled device of the class described, in combination, an oscillatable carriage driven by a machine to be controlled, a record mounted for movement with said carriage, sensing means mounted for oscillatory movement bodily with said carriage and for pivotal movement into and out of contact with said record, a counter, means responsive to said sensing means for setting said counter upon an oscillation of said carriage, means for locking said carriage in its upper position, and a second oscillatable means driven by said controlled machine for actuating said counter.

3. In a counter selector of the type described, in combination, a plurality of sensing fingers adapted to sense the presence or absence of holes in a record tape, a plurality of interposer members responsive to said sensing fingers, a carriage on which said sensing fingers and interposer members are mounted, a plurality of controlled levers positioned to be driven by said carriage when corresponding interposers have been moved, a counter, a plurality of setting pawls for said counter, said setting pawls being operable in response to certain of said sensing fingers, means to oscillate said carriage to actuate said levers and set said counter for a count to be performed, means operable upon the oscillation of said carriage to one extreme position to advance said record tape through one step of movement, and means effective to prevent operation of said sensing fingers upon the oscillation of said carriage to its other extreme position.

4. In a counter selector mechanism of the type described, a perforated record tape, sensing means for reading the said tape, control levers, means operable in response to the operation of said sensing means for actuating said control levers, means normally effective for releasing said control levers upon completion of a cycle of operation of said carriage, and means responsive to one of said sensing means for retaining the control levers in operated position during a predetermined plurality of cycles of said controlled machine.

5. In a counter selector of the type described, in combination, sensing means for sensing the presence or absence of perforations in a record, actuating means driven by said controlled machine, an oscillatable carriage driven by said actuating means, a counter comprising a plurality of counter wheels, means responsive to certain of said setting means and driven by said oscillatable carriage to set said counter to a number in accordance with the record tape, means operable upon setting of the counter to lock said carriage in one of its two positions, means operable by said actuating means to actuate said counter step by step through the number of steps corresponding to the setting, and means operable upon the return of the counter to its initial position to unlock said carriage.

6. In a record controlled device of the class described, a selector mechanism, a counter mechanism, a cyclically operable driving means for said mechanisms, means carried by said driving means for operating said selector mechanism and for setting said counter mechanism, means normally operable to permit a complete cyclic operation of said driving means, and means effective to lock said driving means in one of its extreme positions in the next cyclic operation thereof.

7. In a record controlled device of the class described, a selector mechanism, a counter mechanism, a cyclically operable driving means for said mechanisms actuated by a machine to be controlled, means carried by said driving means for operating said selector mechanism and for setting said counter mechanism, means normally operable to permit a complete cyclic operation of said driving means, and means effective to lock said driving means in one of its extreme positions in the next cyclic operation thereof.

8. In a record controlled device of the class described, in combination, record sensing means, a counter comprising a plurality of counting elements, control means, means responsive to the setting of said record sensing means for conditioning said counter and said control means for operation, cyclically operable means for operating conditioned ones of said control means and counter elements, means for driving said cyclically operable means, and means under the control of said counter for preventing operation of said cyclically operable means.

9. In a record controlled device of the class described, in combination, record sensing means, a counter comprising a plurality of counting elements, control means, means responsive to the setting of said record sensing means for conditioning said counter and said control means for operation, cyclically operable means for operating conditioned ones of said control means and counter elements, means for driving said cyclically operable means, means under the control of said counter for preventing operation of said cyclically operable means, a second cyclically operable means, and means operable thereby during the period when said first means is rendered ineffective for actuating said counter step by step to a setting effective to release said first cyclically operable means.

10. In a record controlled device of the class described, in combination, record sensing means, a counter comprising a plurality of counting elements, control means, means responsive to the setting of said record sensing means for conditioning said counter and said control means for operation, cyclically operable means for operating conditioned ones of said control means and counter elements, means for driving said cyclically operable means, means under the control of said counter for preventing operation of said cyclically operable means, and normally effective means for rendering said preventing means ineffective prior to the first complete cyclic operation of said cyclically operable means.

11. In a record controlled device of the class described, in combination, record sensing means, a counter comprising a plurality of counting elements, control means, means responsive to the setting of said record sensing means for conditioning said counter and said control means for operation, cyclically operable means for operating conditioned ones of said control means and counter elements, means for driving said cyclically operable means, means under the control of said counter for preventing operation of said cyclically operable means, normally effective means for rendering said preventing means ineffective prior to the first complete cyclic operation of said cyclically operable means, a second cyclically operable means, and means operable thereby during the period when said first means is rendered ineffective for actuating said counter step by step to a setting effective to release said first cyclically operable means.

12. In a record controlled device of the class described, in combination, record sensing means, cyclically operable means for rendering said record sensing means periodically effective, a second record sensing means, and means under the control thereof for rendering all record sensing means ineffective during a cycle of operation of said cyclically operable means.

13. In a counter selector mechanism of the type described, in combination, a plurality of record sensing means, cyclically operable means for causing said sensing means to sense a record, and means under the control of one of said sensing means for rendering all sensing means ineffective during a cycle of operation of said cyclically operable means.

14. In a counter selector device of the class described, in combination, a perforated record tape, sensing fingers adapted to cooperate with said tape to sense the record thereof, cyclically operable means comprising an oscillating carriage for rendering said sensing means effective to sense said record, means responsive to the operation of said sensing means and under drive of said carriage to set said counter selector, and means operable in accordance with said setting to prevent the cooperation of said sensing fingers and said tape during a single cycle of said cyclically operable means.

15. In a record controlled counter selector of the class described, in combination, a record tape, sensing fingers adapted to sense the record thereon, an oscillating carriage carrying said record and said sensing means, setting members, interposer members responsive to said sensing means, control levers, a counter comprising a plurality of counter wheels, means carried by said carriage for operating said control levers and said counter wheels through the medium of said setting members and said interposer members, means under the control of said counter wheels for preventing operation of said carriage, and normally operable means for delaying the operation of said preventing means during the first of a series of operations of said carriage.

16. In a record controlled counter selector of the class described, the combination of a counter comprising a plurality of notched counter wheels, means for actuating said counter wheels under the control of the record, a carriage carrying said actuating means, a feeler bar responsive to the positions of notches in said wheels, means resiliently connected to said feeler bar for locking said carriage in elevated position, and means carried by said carriage and cooperating with an arm carried by said resiliently connected means for preventing movement thereof during the ensuing lowering of said carriage.

17. In a counter selector device adapted to the control of an automatic machine, in combination, a main driving member driven by the automatic machine, an oscillatable carriage adapted to be driven by said main driving member, a counter, a plurality of control levers, means for sensing a record, means carried by said carriage for actuating said control levers and said counter in accordance with said sensing, means responsive to said counter for locking said carriage in one of its extreme positions, means driven by said main driving means for advancing said counter step by step, and means operable upon restoration of said counter to initial position to unlock said carriage.

18. In a record controlled device of the class described, a counter, control elements, actuating means for said counter and for said control elements, means for simultaneously selecting said actuating means for operation, means for simultaneously actuating selected actuating means to set said counter and to operate said control levers, means for releasing said operating control levers, and means for thereafter actuating said counter step by step to its initial position.

19. In a device of the class described for controlling the operation of a controlled machine, in combination, a record comprising a line of control element positions, control elements of two kinds positionable along said line, a counter, means operable in accordance with the combinations of the control elements to actuate said counter, each possible combination of control elements representing a specific and different number, additional control elements of the same two kinds positionable along said line, and means directly responsive to the kind and position of said additional elements for controlling the actuation of elements of a controlled machine.

20. In a device of the class described for controlling the operation of a controlled machine, in combination, a record comprising a line of control element positions, control elements positionable along said line, a counter, means operable in accordance with the combinations of the control elements to actuate said counter, each possible combination of control elements representing a specific and different number, said means being operable to set said counter, additional control elements positionable along said line, means responsive to the presence or absence of a control element in a particular position along said line to determine the actuation of control elements of the controlled machine, means operable upon the setting of said counter and actuation of said elements of the controlled machine to prevent repetition of said counter setting and element actuating, and means operable during such prevention to actuate said counter step by step to its initial position.

21. In a device of the class described for controlling the operation of a controlled machine, in combination, a record comprising a line of control element positions, control elements positionable along said line, a counter comprising a plurality of identical counter elements, means operable in accordance with the combination of the control elements to actuate said counter, each possible combination of control elements representing a specific and different number, additional control elements positionable along said line, and means directly responsive to the positioning of said control elements for controlling the actuation of elements of a controlled machine.

22. In a device of the class described for controlling the operation of a controlled machine, in combination, a record comprising a line of control element positions, identical control elements positionable along said line, a counter, means operable in accordance with the combination of positions of the control elements to actuate said counter, each possible combination of control elements and control element positions representing a specific and different number, additional control elements positionable along said line, and means directly responsive to the positioning of said control elements for controlling the actuation of elements of a controlled machine.

23. In a device of the class described for controlling the operation of a controlled machine, in combination, a record comprising a line of control element positions, identical control elements of two kinds positionable along said line, a counter, means operable in accordance with the combinations of positions of the control elements to actuate said counter, each possible combination of control elements and control element positions representing a specific and different number, said means being operable to set said counter, additional control elements positionable along said line, means responsive to the presence or absence of a control element in a particular position along said line to determine the actuation of control elements of the controlled machine, means operable upon the setting of said counter and actuation of said elements of the controlled machine to prevent repetition of said counter setting and element actuating, and means operable during such prevention to actuate said counter step by step to its initial position.

24. In a device of the class described for controlling the operation of a controlled machine, in combination, a record comprising a line of control element positions, identical control elements of two kinds only positionable along said line, a counter comprising a plurality of identical counter elements, means operable in accordance with the combination of positions of the control elements to actuate said counter, each possible combination of control elements and control element positions representing a specific and different number, additional control elements positionable along said line, and means directly responsive to the positioning of said control elements for controlling the actuation of elements of a controlled machine.

HANS P. LUHN.